US008945264B2

(12) United States Patent
Craig

(10) Patent No.: US 8,945,264 B2
(45) Date of Patent: Feb. 3, 2015

(54) CYCLONE WITH A PLURALITY OF INLET DUCTS

(75) Inventor: Ian Mervyn Craig, Stockton-on-Tees (GB)

(73) Assignee: Siemens PLC, Camberley (GB)

( * ) Notice: Subject to any disclaimer, the term of this patent is extended or adjusted under 35 U.S.C. 154(b) by 0 days.

(21) Appl. No.: 14/113,000

(22) PCT Filed: Apr. 18, 2012

(86) PCT No.: PCT/EP2012/057074

§ 371 (c)(1),
(2), (4) Date: Oct. 21, 2013

(87) PCT Pub. No.: WO2012/143390

PCT Pub. Date: Oct. 26, 2012

(65) Prior Publication Data

US 2014/0033662 A1 Feb. 6, 2014

(30) Foreign Application Priority Data

Apr. 19, 2011 (GB) .................................. 1106573.7
Dec. 20, 2011 (GB) .................................. 1121865.8

(51) Int. Cl.

| | |
|---|---|
| ***B01D 45/12*** | (2006.01) |
| ***F27D 17/00*** | (2006.01) |
| ***B04C 5/04*** | (2006.01) |
| ***C21B 7/22*** | (2006.01) |
| ***C21B 7/00*** | (2006.01) |

(52) U.S. Cl.
CPC ................ *B04C 5/04* (2013.01); *F27D 17/008* (2013.01); *C21B 7/22* (2013.01); *C21B 7/002* (2013.01)
USPC ................. 55/459.1; 55/315; 55/419; 55/457

(58) Field of Classification Search
USPC ................................ 55/459.1, 315, 419, 457
See application file for complete search history.

(56) References Cited

U.S. PATENT DOCUMENTS

| | | | |
|---|---|---|---|
| 3,848,550 A | 11/1974 | Bowen | |
| 4,106,892 A | 8/1978 | Haga et al. | |
| 6,610,115 B1 | 8/2003 | Hegemann et al. | |
| 8,202,338 B2 | 6/2012 | Lajtonyi | |
| 8,323,383 B2 | 12/2012 | Evans et al. | |
| 2009/0197753 A1 * | 8/2009 | Lajtonyi | 494/42 |

FOREIGN PATENT DOCUMENTS

| | | | |
|---|---|---|---|
| CN | 1327482 | A | 12/2001 |
| CN | 101213026 | A | 7/2008 |
| CN | 201288197 | Y | 8/2009 |
| EP | 1907125 | A1 | 4/2008 |
| EP | 2125239 | A1 | 12/2009 |
| EP | 1907125 | B1 | 1/2011 |
| FR | 845701 | A | 8/1939 |
| SU | 1060231 | A1 | 12/1983 |
| WO | 2007000242 | A1 | 1/2007 |
| WO | 2008099214 | A1 | 8/2008 |

* cited by examiner

*Primary Examiner* — Dung H Bui
(74) *Attorney, Agent, or Firm* — Laurence A. Greenberg; Werner H. Stemer; Ralph E. Locher

(57) ABSTRACT

A cyclone has a cyclone body formed with a plurality of inlet ducts and an outlet. A first end of each of the inlet ducts is coupled to a downcomer and a second end of each of the inlet ducts is coupled to the cyclone body. The downcomer proximate the cyclone body is co-axial with and mounted to the cyclone body on a support. Each inlet duct exits the downcomer radially and enters the cyclone body tangentially.

7 Claims, 7 Drawing Sheets

CYCLONE WITH A PLURALITY OF INLET DUCTS

BACKGROUND OF THE INVENTION

Field of the Invention

This invention relates to a cyclone, in particular one for use in a gas cleaning stage of an iron making unit.

With a standard single entry cyclone, the plant layout is restricted by the need for the dirty gas entry to enter the cyclone vessel tangentially. This arrangement also limits options for the installation of a furnace isolation valve. It is desirable to install the isolation valve in a vertical position but this only adds to the complex loads from the down-comer that are supported by the cyclone tangentially, which are considerable, most particularly if incorporating an isolation valve prior to the cyclone.

EP2125239 describes a single tangential entry cyclone with a classifier inlet and a small particle by-pass arrangement that allows the efficiency of the cyclone to be adjusted during furnace shut downs or during operation to optimise capture of recyclable material whilst passing on contaminants to the wet cleaning system. However, a down-comer applied directly tangentially, may not give enough swirl effect in the cyclone.

U.S. Pat. No. 6,610,115 describes an axial entry cyclone with internal vanes to provide a swirl effect. However, the large number of vanes with narrow gaps between them can suffer in harsh operating conditions and become blocked, so that they do not operate as effectively as they should.

EP1907125 describes a cyclone separator for a blast furnace gas having a pair of inlet ducts inclined in a downward direction in order to optimise performance.

CN201288197 describes a similar design in which removable lining panels have been provided.

BRIEF SUMMARY OF THE INVENTION

In accordance with the present invention, a cyclone comprises a cyclone body, a plurality of inlet ducts and an outlet; wherein a first end of each of the inlet ducts is coupled to a downcomer and a second end of each of the inlet ducts is coupled to the cyclone body; wherein the downcomer proximate the cyclone body is co-axial with and mounted to the cyclone body on a support; and wherein each inlet duct exits the downcomer radially and enters the cyclone body tangentially.

This design copes with structural loading from the downcomer by mounting an end of the down-comer to the cyclone body, on a support, whilst allowing for ease of replacement of parts for maintenance and maintains the benefits of the classifying effect with the tangential entry in a plane perpendicular to the longitudinal axis of the cyclone body.

Preferably, the first end of the inlet duct has a circular cross section

Refractory lining is generally more stable in a circular duct than a rectangular or square duct, as well as eliminating the need for an additional transition between square and circular at the inlet to the isolation valve, which is circular Preferably, the second end of the inlet duct has a rectangular cross section.

This results in a better tangential flow into the cyclone vessel, as the edge of the rectangle aligns entirely with the vertical edge of the cyclone vessel, whereas a circular duct would only align at one point.

Preferably, the cyclone comprises three or more inlet ducts.

This helps to produce a good swirl effect. A cyclone comprising three inlet ducts gives a particularly good combination of duct size to prevent clogging up and swirl effect.

Although the inlet ducts could be arranged to have any convenient spacing, for example to enable fitting into existing available space, preferably the inlet ducts are spaced equidistant from one another about the cyclone body.

Preferably, the outlet duct exits through the support.

Although an isolation valve could be mounted in the downcomer in a conventional way, preferably an isolation valve is mounted in each inlet duct.

This avoids the need for an expansion joint to allow access for maintenance.

BRIEF DESCRIPTION OF THE SEVERAL VIEWS OF THE DRAWING

An example of a cyclone according to the present invention will now be described with reference to the accompanying drawings in which.

DESCRIPTION OF THE INVENTION

Figure 1:
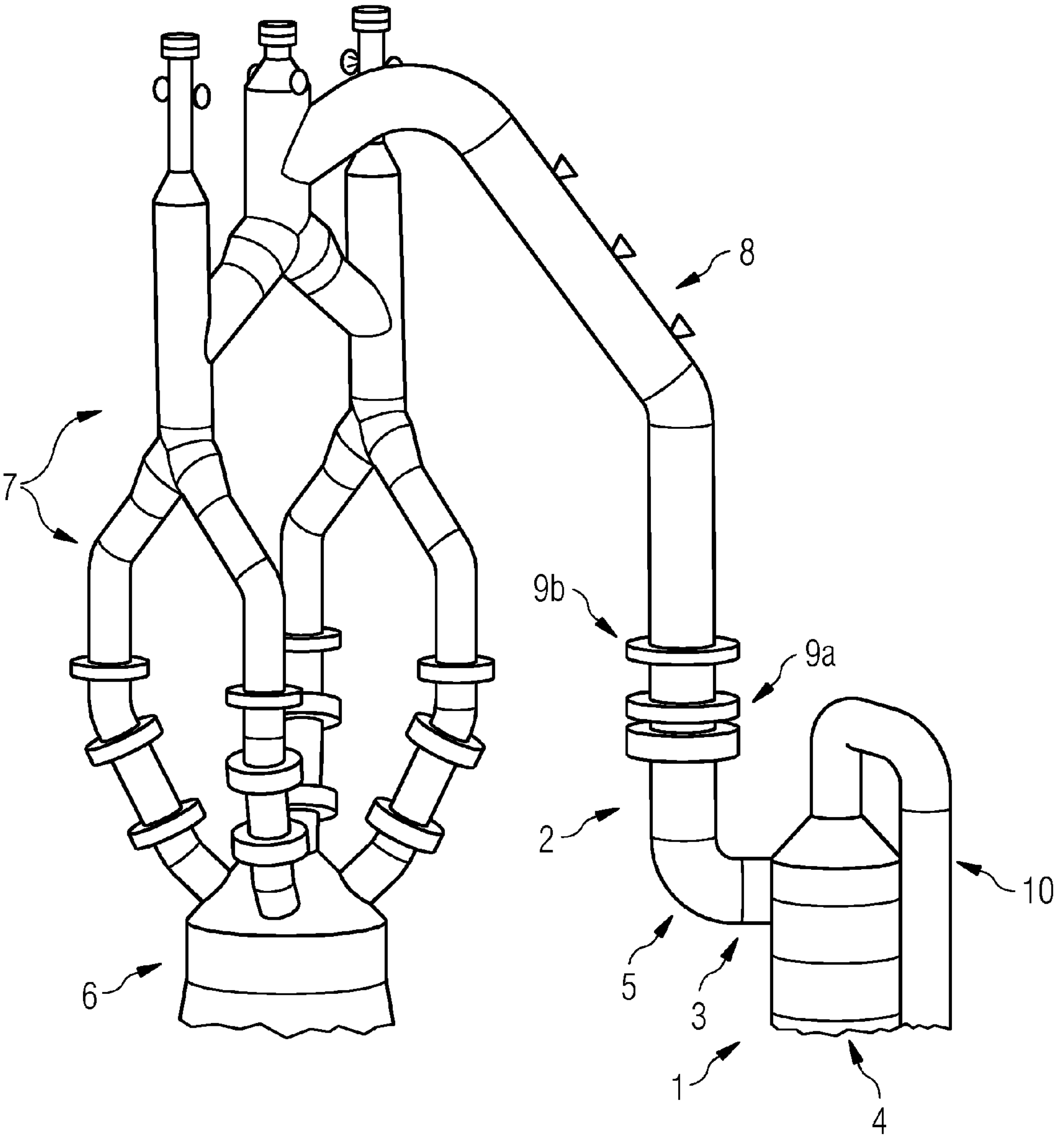
FIG. 1 illustrates a blast furnace off gas system with standard side entry cyclone with single entry.

FIG. 1 illustrates a conventional blast furnace off gas system with standard side entry cyclone. The cyclone 1 has a substantially cylindrical body and further comprises an inlet duct 2 having a region 3 which enters the body 4 tangentially by virtue of bend 5. Gas from a top part 6 of a blast furnace passes into an off-take gas system 7, through a down-comer 8, optionally through an isolation valve 9*a*, into the cyclone 1 and from the cyclone exits through an outlet 10. With a single entry, it can be difficult to transfer all loads from the off-takes and down-comer with the fitting of the isolation valve and expansion joint to the cyclone correctly. Another problem with a side entry to the cyclone is that this limits how close the cyclone is to the furnace. As a result, this may cause issues with retrofitting a cyclone with a side entry to an existing plant. In addition, the cyclone itself may be unevenly loaded with a side entry, so an axial arrangement is preferred.

In the single entry cyclone, the dirty gas from a blast furnace is delivered to a first stage cleaning plant via the down-comer 8 that slopes steeply, often at an angle between 40 and 55 degrees, depending upon site layout. The entry to the cyclone 1 is in the horizontal plane and is rectangular in section. Turning the gas flow into the horizontal plane creates a classifier inlet. In other applications, internal guide vanes may be used, typically in the rectangular section, to improve the flow distribution entering the cyclone.

Figure 2A:
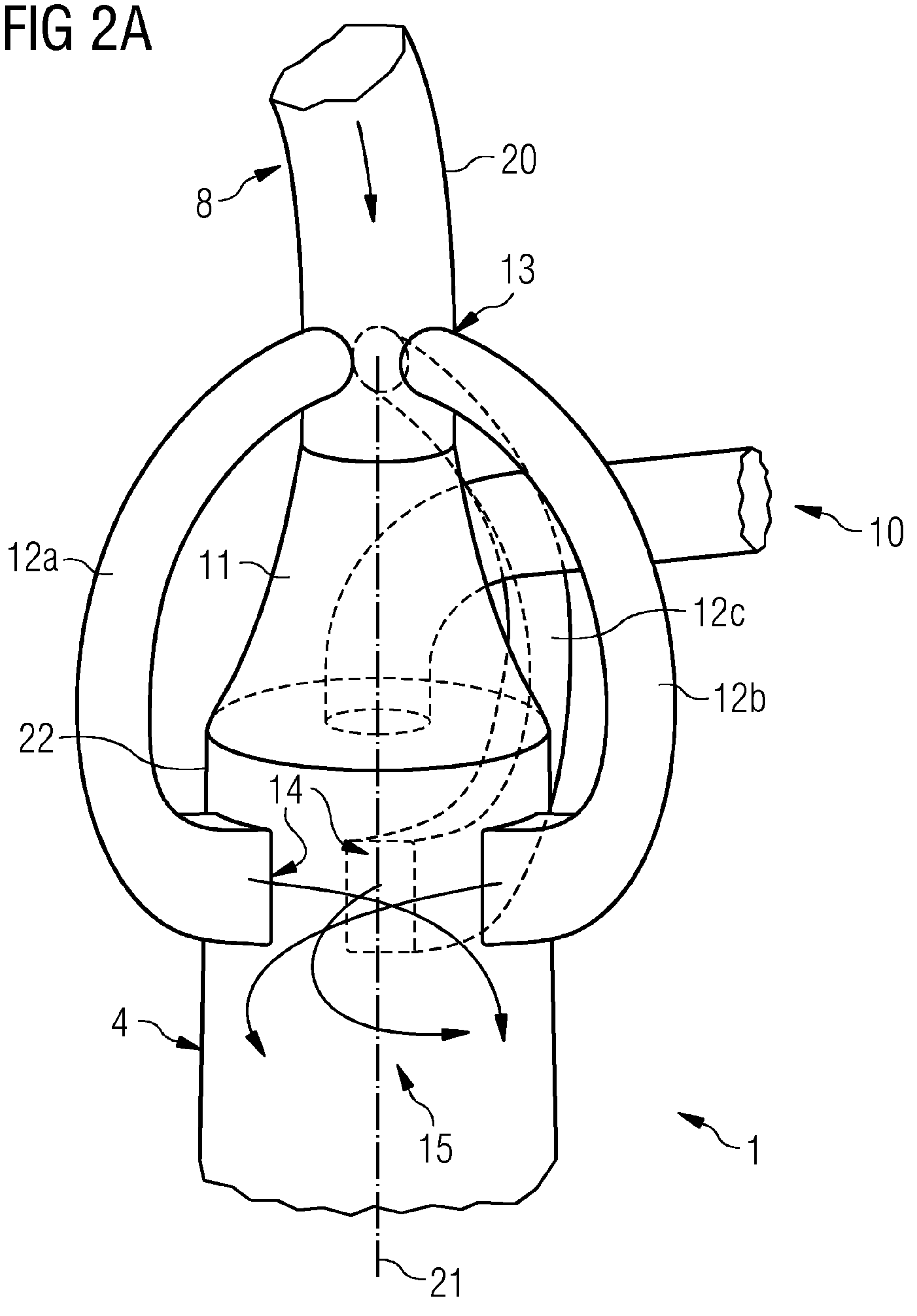
FIG. 2*a* is a perspective view of a cyclone according to the present invention, with multiple entries.
Figure 2B:
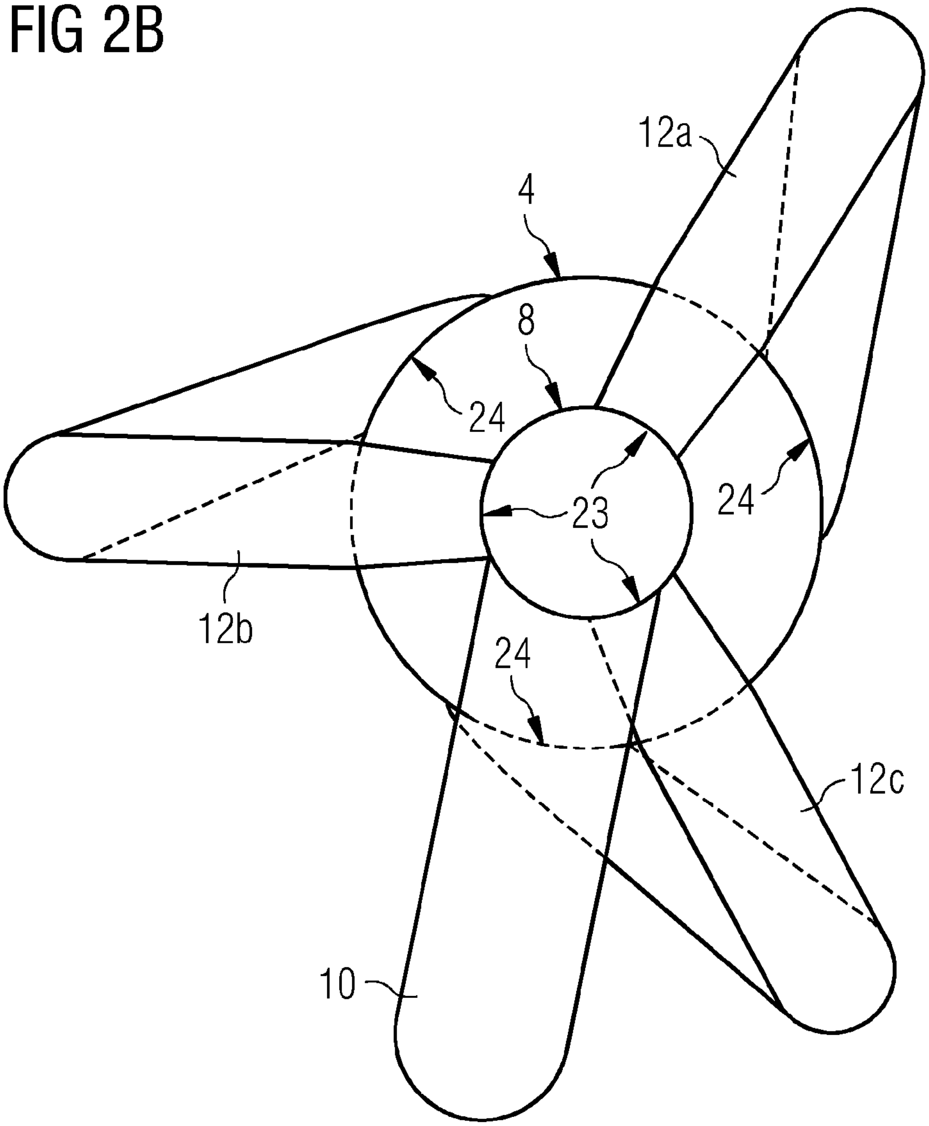
FIG. 2*b* is a view from above of the cyclone of FIG. 2*a;*

The problems associated with the conventional single side entry design are addressed in the present invention by providing an alternative arrangement, for example a cyclone whose top part and connections are as illustrated in FIGS. 2*a* and 2*b*.

The cyclone is cylindrical with a longitudinal axis 21 and is provided with at least two inlet ducts 12*a*, 12*b*, 12*c*, but more typically three or four inlet ducts are used in order to promote better gas flow within the cyclone. The examples of FIGS. 2*a* and 2*b* and of FIG. 5 illustrate three and four inlet ducts respectively. In a preferred embodiment, the invention provides a triple entry tangential cyclone. In the present invention, the down-comer 8 is arranged so that at an end 20 closest to the cyclone body 4 a central axis of the down-comer 8 is substantially co-axial with longitudinal axis 21 of the cyclone body 4. A support 11 is provided between the upper part 22 and the end 20 of the downcomer 8. This support is also preferably co-axial with the longitudinal axis 21 of the cyclone body 4. An example of the support 11 can be seen in FIG. 2*a*, where the down-comer 8 is provided with structural support, which may be in the form of an enclosure, such as a hemisphere, or truncated cone, or may be another suitable shape, such as a framework of struts, which transfers the loading from the down-comer 8 onto the walls of the cylindrical cyclone body 4. A plurality of cyclone inlet ducts 12*a*, 12*b*, 12*c* are provided between the down-comer 8 and the upper part of the cyclone body 4. The ducts may be tubes or pipes, the cross section of which preferably varies, changing from a circular cross-section at a first end 13 connected to the down-comer 8, to a rectangular cross-section at a second end 14 connected to the cyclone. The tube emerges radially from the down-comer and is rotated to enter the cyclone tangentially. Using this design, with at least three tangential inlets combined with axial support from the cyclone vessel, provides the optimum transfer of structural load for the down-comer 8. FIG. 2*b* illustrates this example as seen from above. The change from the radial exit 23 of the inlet ducts 12*a*, 12*b*, 12*c* from the down-comer 8 to the tangential entries 24 of the inlet ducts to the cyclone body 4 can be clearly seen in this view.

The design enables the load to be concentric with the cyclone vessel. The inlet ducts act as a first stage classifier, separating large and fine particles before entering the cyclone. Using these mini classifiers allows the segregation process to start before the gas enters the cyclone. The gas flow in the down-comer 8 is split between the inlet ducts and enters the cyclone at 90 degrees to the direction of the flow from the down-comer. The number of inlet ducts is not limited to only three and could be more, but three inlets is more stable than using less than three and with three entries this gives a sufficiently wide bore to prevent clogging up of the inlets due to dust or debris, or as a result of environmental conditions in harsh operating environments, as well as allowing a construction whereby the loads are transferred onto the cyclone side walls from above, so avoiding the uneven loading on the cyclone which a conventional single entry pipe suffers from.

Figure 3:
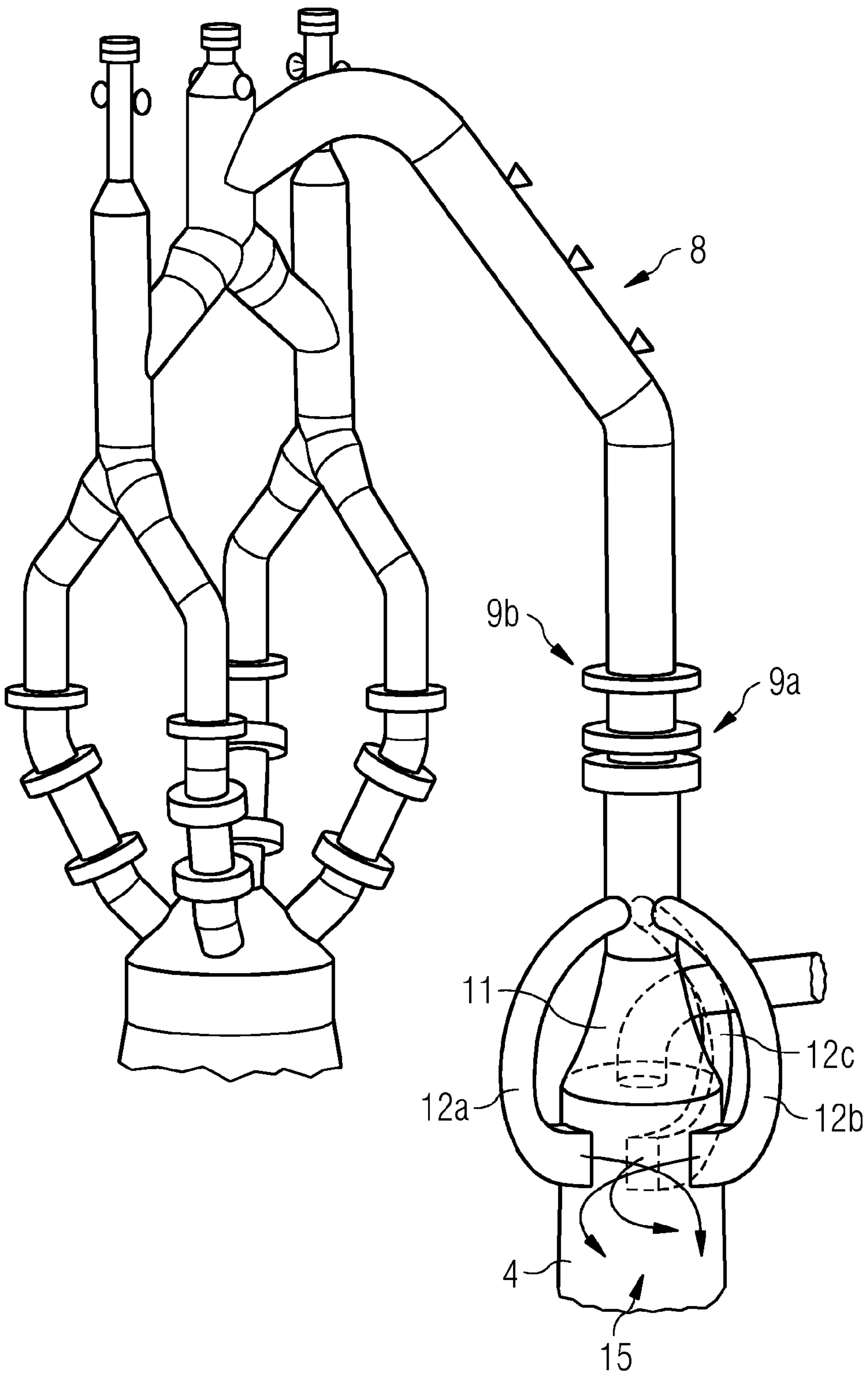
FIG. 3 illustrates a blast furnace off gas system with the cyclone of FIGS. 2*a* and 2*b;*

FIG. 3 illustrates how the revised design of the cyclone is integrated into the off-take gas system 7 and supports the down-comer 8 and optional isolation valve 9*a* and expansion joint 9*b*. For health and safety reasons, it is desirable to provide an isolation valve 9*a* between the down-comer and the cyclone. This may be a single valve 9*a* in the down corner itself as shown in FIG. 3, or alternatively, an isolation valve (not shown) may be provided in each of the inlet ducts 12*a*, 12*b*, 12*c*. Modifying the relative positions of the down-comer and cyclone body according to the present invention makes the provision of the isolation valve in a vertical position more practical, as the loading is transferred onto the cyclone body, rather than needing to be supported by the bend in a single inlet as in FIG. 1. The isolation valve may be a sliding plate valve, or a blanking plate, available to be operated when required. A blanking plate may be inserted, or removed during a furnace shutdown. An expansion joint 9*b* is also required to be fitted to enable the valve to be removed for maintenance purposes. The advantage of each inlet duct having its own isolation valve fitted, as described above, is that this removes the need for expansion joints to be fitted for valve maintenance removal purposes. A further benefit of mounting the valves in the ducts is that the down-comer loads are independently transferred into the cyclone without the complication of transferring the loads around the isolation valve and expansion joint.

Figure 4:
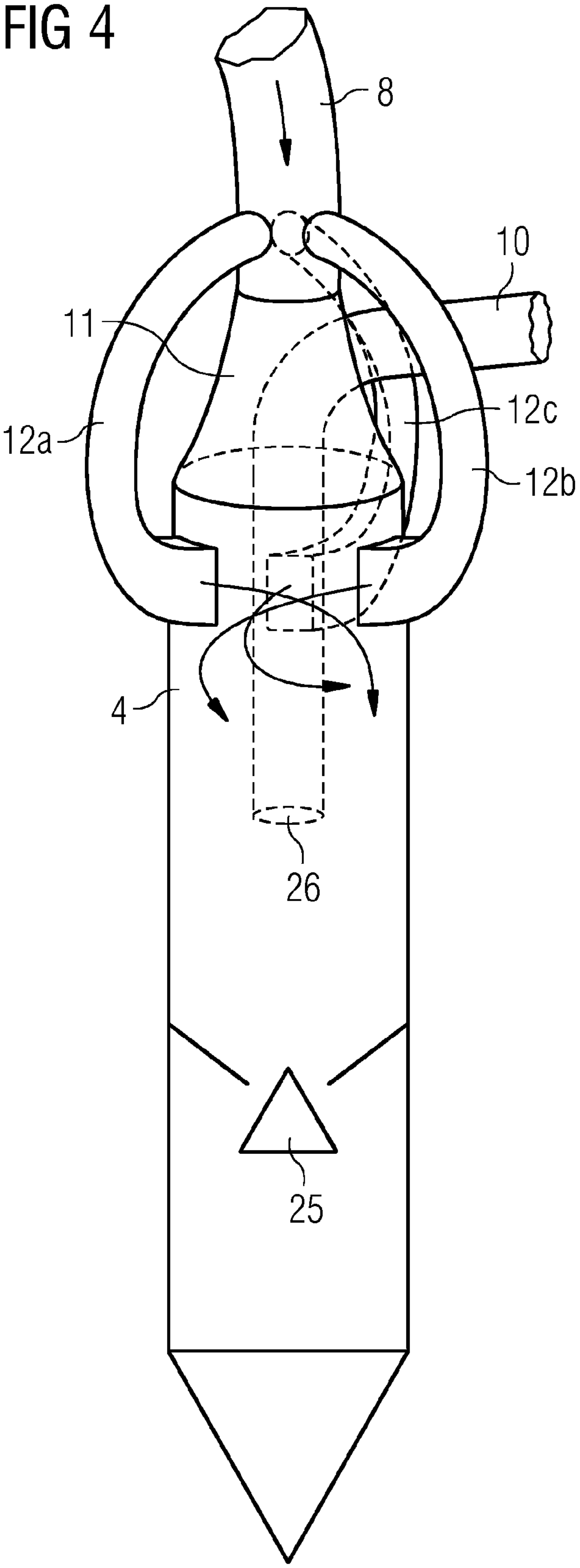
FIG. 4 is an alternative view of the cyclone of FIGS. 2*a* and 2*b;*

FIG. 4 shows the full cyclone with the improved inlet duct arrangement. The down-comer carrying dirty gas in a gas main approaches the cyclone axially, allowing installation of a furnace isolation valve in a vertical position and providing more flexibility in terms of cyclone plant location. The down-comer may be modified to have a larger diameter, for example, with the use of a secondary vessel. Cones 25 in the cyclone perform separation of particles from the gas supply and a long outlet duct 26 which extends into the interior of the cyclone body feeds the cleaned gas back up into the outlet 10. The design has more than two inlet ducts 12*a*, 12*b*, 12*c* arranged to enter the cyclone cylinder tangentially. This ensures that the swirl effect is evenly distributed around the cyclone inlet and reduces wear by minimising high velocity areas.

Figure 5A:
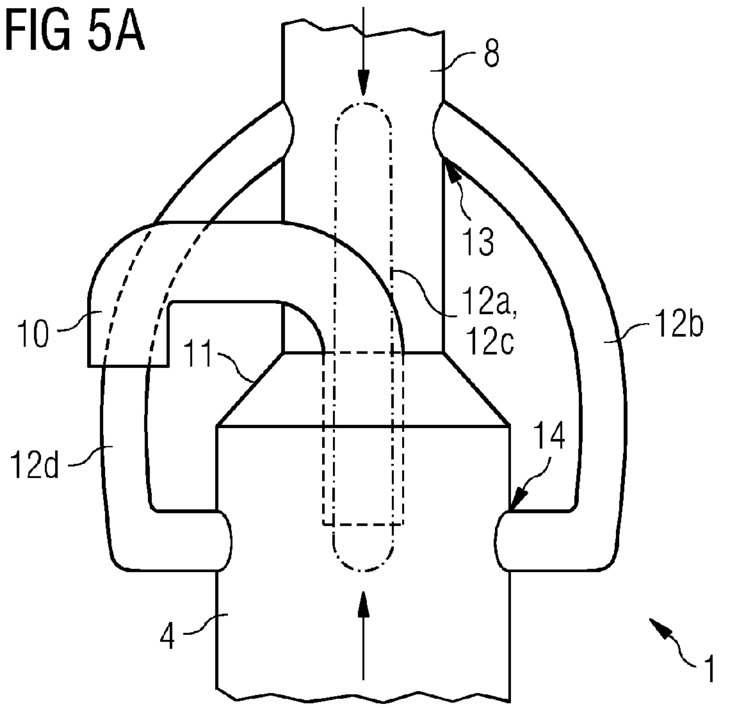
FIGS. 5*a* is a partial view of an example of a cyclone according to the present invention with 4 inlet ducts.
Figure 5B:
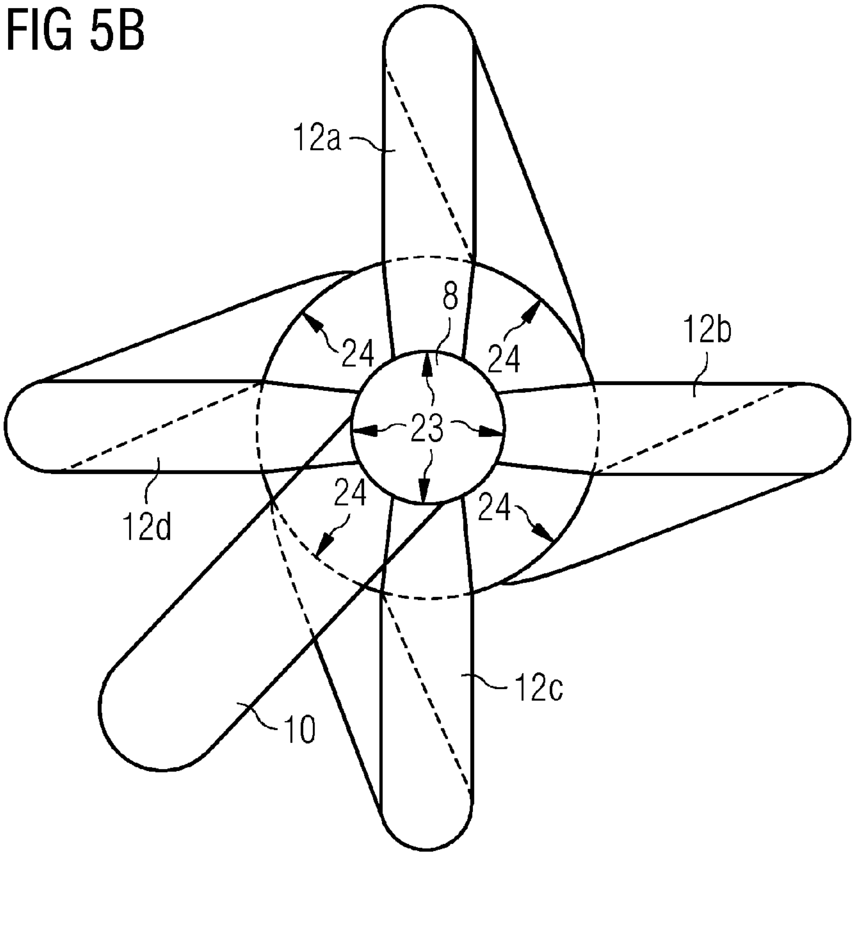
FIG. 5*b* is a view from above of a cyclone according to the present invention with 4 inlet ducts; and, FIGS. 6*a* and 6*b* illustrate examples of conventional horizontal and inclined entry cyclones.

FIGS. 5*a* and 5*b* illustrate an example of the present invention with four inlet ducts. In FIG. 5*a*, only two are shown for clarity, on either side of the cyclone body. As can be seen in the view from above in FIG. 5*b*, the inlet ducts 12*a*, 12*b*, 12*c*, 12*d* are spaced about the down-comer 8 and cyclone body 4, substantially equidistant from one another, exiting 23 from the down-comer radially and entering 24 the cyclone body tangentially. The inlet duct has a central axis at the second end 14 which is in a plane perpendicular to the longitudinal axis 21 of the cyclone body 4.

Figure 6A:
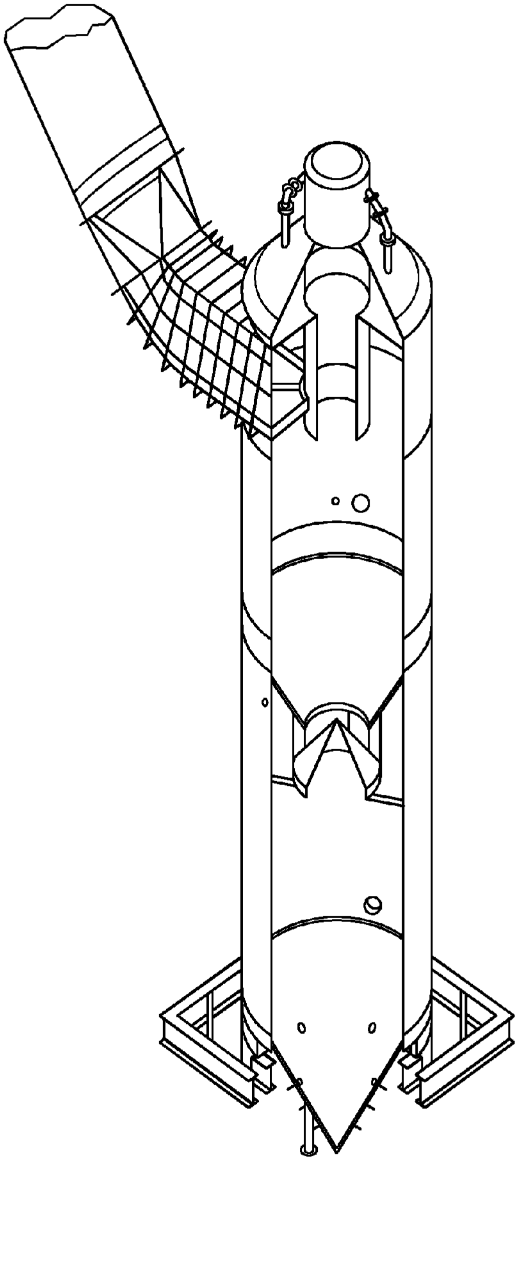
Figure 6B:
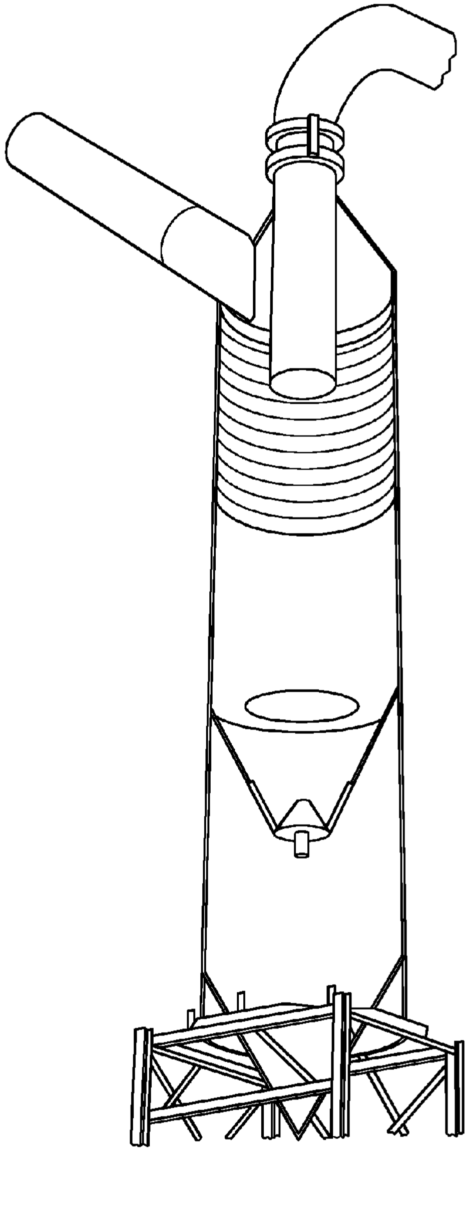

For comparison, FIG. 6*a* illustrates an example of a conventional cyclone with horizontal entry and FIG. 6*b* illustrates a conventional cyclone with inclined entry.

In summary, the present invention provides a cyclone arrangement comprising a down-comer and a plurality of inlet ducts, preferably, three or more inlet ducts between the down-comer and the cyclone. Preferably, the cyclone comprises a triple entry tangential cyclone. The inlet ducts enter the cyclone through side walls of the cyclone body and are preferably circumferentially spaced about the cyclone. The downstream end of the down-comer is co-axial with a central axis of the cyclone. The inlet ducts may exit the down-comer radially and enter the cyclone tangentially. The cyclone of the present invention provides structural loading and plant layout advantages associated with an axially orientated cyclone, combined with the advantages of multiple tangential entry, which include ease of replacement of the main wear parts including the external ducts. A further advantage is that removing the ducts, which are constructed using several flanged joints, means the cyclone can be totally isolated from the iron making unit, which has important safety implications for performing maintenance on the cyclone.

The invention claimed is:

1. A cyclone, comprising:

a cyclone body having a longitudinal axis;

a downcomer connected to said cyclone body, said downcomer proximate said cyclone body being coaxial with said longitudinal axis and mounted to said cyclone body on a support;

a plurality of inlet ducts each having a first end coupled to said downcomer and a second end coupled to said cyclone body, each inlet duct exiting said downcomer radially and entering said cyclone body tangentially; and an outlet duct.

2. The cyclone according to claim 1, wherein said first end of each said inlet duct has a circular cross section.

3. The cyclone according to claim 1, wherein said second end of each said inlet duct has a rectangular cross section.

4. The cyclone according to claim 1, wherein said plurality of inlet ducts includes three or more inlet ducts.

5. The cyclone according to claim 1, wherein said inlet ducts are spaced equidistant from one another about said cyclone body.

6. The cyclone according to claim 1, wherein said outlet duct exits through said support.

7. The cyclone according to claim 1, which comprises an isolation valve mounted in each of said inlet ducts.

* * * * *